US011403065B2

United States Patent
Weinstein et al.

(10) Patent No.: US 11,403,065 B2
(45) Date of Patent: Aug. 2, 2022

(54) USER INTERFACE CUSTOMIZATION BASED ON SPEAKER CHARACTERISTICS

(71) Applicant: Google LLC, Mountain View, CA (US)

(72) Inventors: Eugene Weinstein, New York, NY (US); Ignacio L. Moreno, New York, NY (US)

(73) Assignee: Google LLC, Mountain View, CA (US)

( * ) Notice: Subject to any disclaimer, the term of this patent is extended or adjusted under 35 U.S.C. 154(b) by 0 days.

(21) Appl. No.: 17/136,069

(22) Filed: Dec. 29, 2020

(65) Prior Publication Data

US 2021/0117153 A1 Apr. 22, 2021

Related U.S. Application Data

(63) Continuation of application No. 15/230,891, filed on Aug. 8, 2016, now Pat. No. 11,137,977, which is a continuation of application No. 14/096,608, filed on Dec. 4, 2013, now abandoned.

(51) Int. Cl.
  *G06F 3/16* (2006.01)
  *G06F 9/451* (2018.01)
  *G06F 40/109* (2020.01)
  *G06F 3/04817* (2022.01)

(52) U.S. Cl.
  CPC .......... *G06F 3/167* (2013.01); *G06F 3/04817* (2013.01); *G06F 9/451* (2018.02); *G06F 40/109* (2020.01)

(58) Field of Classification Search
  None
  See application file for complete search history.

(56) References Cited

U.S. PATENT DOCUMENTS

| | | | |
|---|---|---|---|
| 6,868,525 B1 | 3/2005 | Szabo | |
| 7,917,361 B2 | 3/2011 | Li et al. | |
| 8,050,922 B2 | 11/2011 | Chen | |
| 2002/0095295 A1* | 7/2002 | Cohen | H04M 3/493 704/275 |
| 2002/0135618 A1* | 9/2002 | Maes | G06F 3/0481 715/767 |
| 2002/0162031 A1* | 10/2002 | Levin | G06Q 10/10 726/7 |
| 2002/0194003 A1* | 12/2002 | Mozer | G10L 17/00 704/270.1 |
| 2003/0018475 A1* | 1/2003 | Basu | G06V 40/161 704/E11.003 |
| 2003/0233233 A1* | 12/2003 | Hong | G10L 15/20 704/256.5 |

(Continued)

OTHER PUBLICATIONS

H. Ney, "On the probabilistic interpretation of neural network classifiers and discriminative training criteria," in IEEE Transactions on Pattern Analysis and Machine Intelligence, vol. 17, No. 2, pp. 107-119, Feb. 1995, doi 10.1109/34.368176. (Year: 1995).

(Continued)

*Primary Examiner* — Henry Orr
(74) *Attorney, Agent, or Firm* — Honigman LLP; Brett A. Krueger; Grant Griffith

(57) ABSTRACT

Characteristics of a speaker are estimated using speech processing and machine learning. The characteristics of the speaker are used to automatically customize a user interface of a client device for the speaker.

20 Claims, 5 Drawing Sheets

(56) References Cited

U.S. PATENT DOCUMENTS

| | | | |
|---|---|---|---|
| 2004/0030750 A1* | 2/2004 | Moore | H04M 15/08 709/204 |
| 2004/0039570 A1* | 2/2004 | Harengel | G10L 13/08 704/E15.044 |
| 2004/0059705 A1* | 3/2004 | Wittke | G06N 5/00 |
| 2004/0224771 A1* | 11/2004 | Chen | A63F 13/335 463/42 |
| 2004/0235530 A1* | 11/2004 | Arun | H04M 1/271 455/563 |
| 2005/0016360 A1* | 1/2005 | Zhang | G10H 1/0033 84/600 |
| 2005/0070276 A1 | 3/2005 | McGarry | |
| 2006/0136207 A1* | 6/2006 | Kim | G10L 15/08 704/E15.014 |
| 2007/0198263 A1* | 8/2007 | Chen | G10L 15/065 704/E15.009 |
| 2008/0040110 A1* | 2/2008 | Pereg | G10L 17/26 704/E15.014 |
| 2008/0046241 A1* | 2/2008 | Osburn | G10L 17/26 704/250 |
| 2008/0103761 A1* | 5/2008 | Printz | G10L 15/142 704/9 |
| 2008/0147404 A1 | 6/2008 | Liu et al. | |
| 2008/0172610 A1* | 7/2008 | Blair | H04M 1/23 715/700 |
| 2009/0063988 A1 | 3/2009 | Graeff et al. | |
| 2009/0216528 A1* | 8/2009 | Gemello | G10L 15/065 704/E15.046 |
| 2009/0271503 A1 | 10/2009 | Pearce | |
| 2010/0086277 A1* | 4/2010 | Craner | H04N 5/76 386/278 |
| 2010/0151847 A1 | 6/2010 | Wilson et al. | |
| 2010/0330975 A1 | 12/2010 | Basir | |
| 2011/0066950 A1 | 3/2011 | Wilson et al. | |
| 2011/0153317 A1* | 6/2011 | Mao | G10L 17/26 704/207 |
| 2012/0143863 A1 | 6/2012 | Tran | |
| 2012/0166190 A1* | 6/2012 | Lee | G10L 21/0208 704/E15.039 |
| 2012/0215639 A1* | 8/2012 | Ramer | G06Q 30/0269 705/14.64 |
| 2012/0260294 A1* | 10/2012 | Reichardt | H04N 21/482 725/60 |
| 2013/0017806 A1* | 1/2013 | Sprigg | H04M 1/66 455/411 |
| 2013/0097416 A1 | 4/2013 | Barra et al. | |
| 2013/0110511 A1* | 5/2013 | Spiegel | G10L 15/22 704/E15.001 |
| 2013/0139229 A1* | 5/2013 | Fried | H04L 63/08 726/5 |
| 2013/0145457 A1* | 6/2013 | Papakipos | G06F 21/6245 726/19 |
| 2013/0160141 A1 | 6/2013 | Tseng et al. | |
| 2013/0185080 A1* | 7/2013 | Reichardt | H04N 21/42203 704/275 |
| 2013/0227675 A1 | 8/2013 | Fujioka | |
| 2013/0297927 A1 | 11/2013 | Bora | |
| 2014/0282061 A1* | 9/2014 | Wheatley | H04N 21/4332 715/745 |
| 2015/0039301 A1 | 2/2015 | Senior et al. | |
| 2015/0154002 A1 | 6/2015 | Weinstein et al. | |

OTHER PUBLICATIONS

Chan et al., "Classification of Speech Accents with Neural Networks", 1994. IEEE World Congress on Computational Intelligence., 1994 IEEE International Conference on (vol. 7) Date of Conference: Jun. 27-Jul. 2, 1994 pp. 4483-4486 vol.7 Print ISBN: 0-7803-1901-X INSPEC Accession No. 4956992 pp. 4483-4486 vol.7 Print ISBN: 0-7803-1901-X INSPEC Accession No. 4956992.

Chen, Tao et al., "Automatic Accent Identification using Gaussian Mixture Models," IEEE Workshop on ASRU (2001), 4 pages.

Cole, Ronald A. et al., "Language identification with neural networks: a feasibility study," Communications, Computers and Signal Processing, 1989 Conference Proceeding., IEEE Pacific Rim Conference on, 1989, pp. 525-529.

Hirose, Keikichi et al., "Accent Type Recognition and Syntactic Boundary Detection of Japanese Using Statistical Modeling of Moraic Transitions of Fundamental Frequency Contours," Proc. IEEE ICASSP'98 (1998), 4 pages.

Martinez, David et al., "Language Recognition in iVectors Space.," INTERSPEECH., pp. 861-864, ISCA (2011), 4 pages.

Rao, K. et al., "Emotion Recognition From Speech Using Global and Local Prosodic Features," Int'l Journal of Speech Technology, vol. 16, Issue 2, pp. 143-160 (Jun. 2013).

Ververidis, D. et al., "Emotional speech recognition: Resources, features, and methods," Speech Communication 48, pp. 1162-1181 (2006).

\* cited by examiner

USER INTERFACE CUSTOMIZATION BASED ON SPEAKER CHARACTERISTICS

CROSS-REFERENCE TO RELATED APPLICATIONS

This U.S. patent application is a continuation of, and claims priority under 35 U.S.C. § 120 from, U.S. patent application Ser. No. 15/230,891, filed on Aug. 8, 2016, which is a continuation of U.S. patent application Ser. No. 14/096,608, filed on Dec. 4, 2013. The disclosures of these prior applications are considered part of the disclosure of this application and are hereby incorporated by reference in their entireties.

TECHNICAL FIELD

This specification describes technologies relates to adjustment of a user interface based on characteristics of a speaker.

BACKGROUND

Client devices may be shared by multiple users, each of which may have different characteristics and preferences.

SUMMARY

Characteristics of a speaker may be estimated using speech processing and machine learning. The characteristics of the speaker, such as age, gender, emotion, and/or dialect, may be used to automatically customize a user interface of a client device for the speaker. The speaker's characteristics may also be provided to other applications executing on the client device to enhance their content and provide a richer user experience.

In general, one aspect of the subject matter includes the action of selecting a user profile associated with a user interface. The actions further include, after selecting the user profile, obtaining an audio signal encoding an utterance of a speaker. The actions also include processing the audio signal to identify at least one characteristic of the speaker. And the actions include customizing the user interface associated with the user profile based on the at least one characteristic. The characteristic may include, for example, an age, gender, dialect, or emotion of the speaker. Some implementations include the further action of providing the at least one characteristic of the speaker to a third-party application.

In some implementations, customizing the user interface associated with the user profile based on the at least one characteristic may include changing a font size of the user interface based on the at least one characteristic, changing a color scheme of the user interface based on the at least one characteristic, restricting access to one or more applications on the user interface based on the at least one characteristic, providing access to one or more applications on the user interface based on the at least one characteristic, restricting access to one or more applications provided by the user interface based on the at least one characteristic.

In some implementations, selecting a user profile includes selecting, at a client device, a user profile based on one or more of a password, voice recognition, speech recognition, fingerprint recognition, or facial recognition. Alternatively or in addition, in some implementations, selecting a user profile includes selecting, at a client device, a default user profile for the client device.

In some implementations, processing the audio signal to identify at least one characteristic of the speaker includes the actions of providing the audio signal as an input to a neural network and receiving a set of likelihoods associated with the at least one characteristic as an output of the neural network.

Another general aspect of the subject matter includes the action of obtaining an audio signal encoding an utterance of a speaker. The actions further include performing speech recognition, voice recognition, or both on the audio signal to select a user profile associated with a user interface. The actions also include processing the audio signal to identify at least one characteristic of the speaker. And the actions include customizing the user interface associated with the user profile based on the at least one characteristic. The characteristic may include, for example, an age, gender, dialect, or emotion of the speaker. Some implementations include the further action of providing the at least one characteristic of the speaker to a third-party application.

In some implementations, customizing the user interface associated with the user profile based on the at least one characteristic may include changing a font size of the user interface based on the at least one characteristic, changing a color scheme of the user interface based on the at least one characteristic, restricting access to one or more applications on the user interface based on the at least one characteristic, providing access to one or more applications on the user interface based on the at least one characteristic, restricting access to one or more applications provided by the user interface based on the at least one characteristic.

In some implementations, processing the audio signal to identify at least one characteristic of the speaker includes the actions of providing the audio signal as an input to a neural network and receiving a set of likelihoods associated with the at least one characteristic as an output of the neural network.

Some implementations may advantageously customize a user interface based on characteristics of a speaker, thus providing a rich user experience. Some implementations also may advantageously provide characteristics of a speaker to other applications to enhance their content and provide a richer user experience.

The details of one or more embodiments of the subject matter described in this specification are set forth in the accompanying drawings and the description below. Other potential features, aspects, and advantages of the subject matter will become apparent from the description, the drawings, and the claims.

BRIEF DESCRIPTION OF THE DRAWINGS

Like reference numbers and designations in the various drawings indicate like elements.

DETAILED DESCRIPTION

Figure 1:
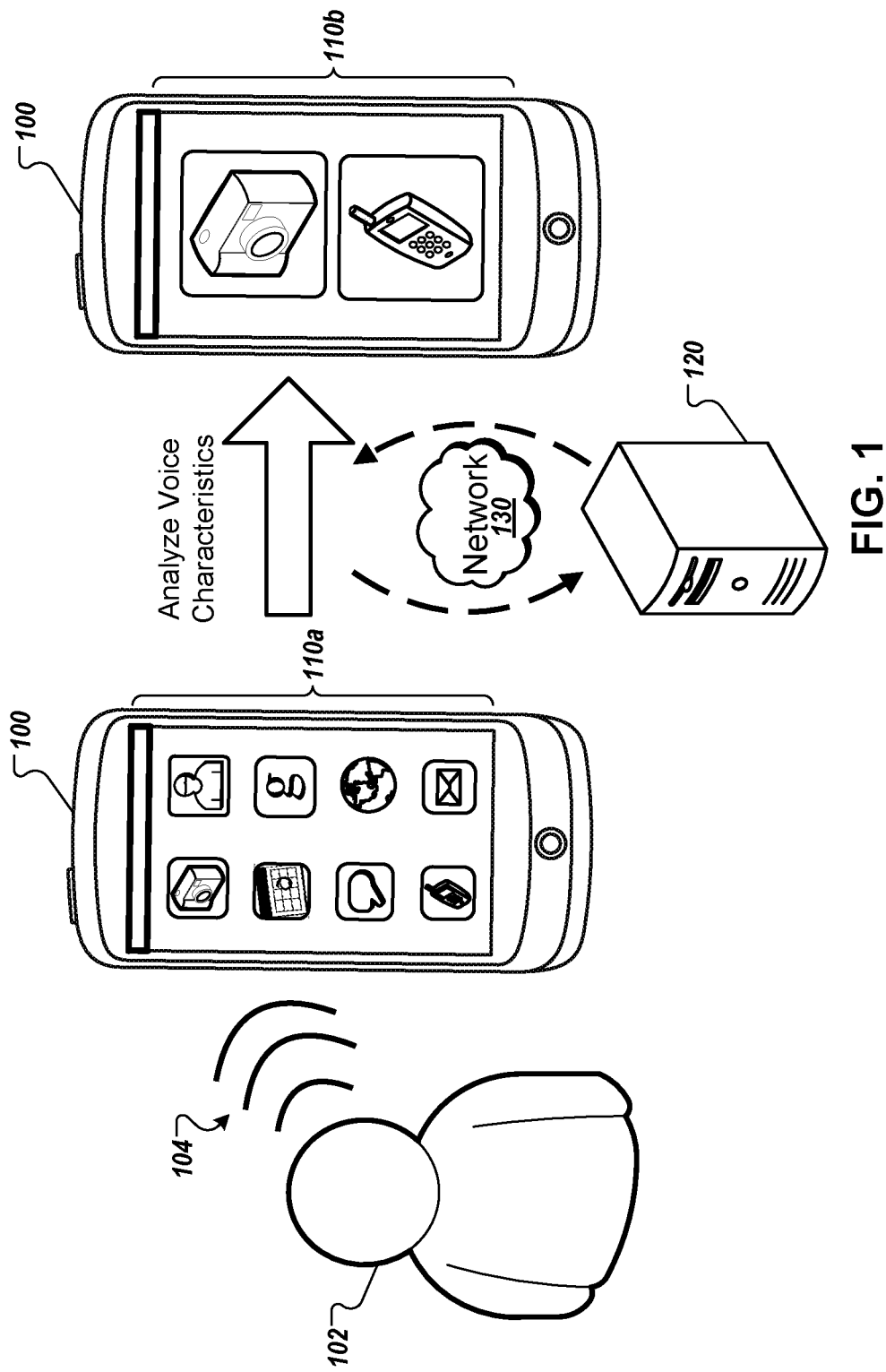
FIG. 1 is a diagram that illustrates a client device configured to identify characteristics of a speaker and customize a user interface based on the identified characteristics.

Typical client devices do not automatically perform customization based on characteristics of the person using the device. When users share devices, this may mean that the user interface for any given user may not match that user's preferences. In addition, even when only a single user operates a given client device, it may be desirable to automatically tailor the user interface to settings that may be typically preferred by individuals with the user's characteristics. For example, a young child operating a client device may prefer large icons, little or no text, and the ability to play some games and call home. The child's parents also may prefer that the client device restrict access to most applications while the child is using the client device. As another example, an elderly individual may prefer large icons and text and unrestricted access to applications on the client device. By detecting characteristics of the user, the client device may be able to automatically customize the user interface to provide such settings without requiring the user to manually apply the settings.

As described in this disclosure, a client device may customize a user interface based on characteristics that it estimates using the speaker's voice. For example, when a user logs into a client device using a voice unlock feature with speaker verification and/or uses voice search or voice input, a speech recording may be made and analyzed by a classifier to identify characteristics of the user. These characteristics may include, for example, the user's age, gender, emotion, and/or dialect.

Once a speech recording is made, a trait classification pipeline may be activated. The pipeline may include processes at the client device and/or a speech recognition server. In the pipeline, a speech recognition processor could be applied to compute mel-frequency cepstral coefficients (MFCCs), perceptive linear predictive (PLP), and/or filter-bank energy features. The output of the feature computation step could then be provided to a statistical classifier such as a Gaussian mixture model or a neural network trained to classify the features of interest. Training data for the classifier could include, for example, voice search logs annotated as corresponding to: child, adult, or elderly speech; male or female speech; happiness or sadness; or regionally dialected speech. Classifications for certain characteristics may be determined using other techniques, such as, for example, using the pitch characteristics of the speech recording to detect child speech, or by clustering data for male and female speakers.

Various customizations based on the identified characteristics may be implemented. Such customizations may be particularly advantageous in the case of children, who are likely to benefit from a specially customized user interface, and who also may be prone to altering preferred settings of adult users of a device, e.g., by changing settings, deleting files, etc. Additionally, children may be vulnerable to being harmed by unfiltered speech from the Internet, and they may therefore benefit from having the client device automatically provide a "safe mode" that restricts web browsing and only allows the use of selected child-safe applications when child speech is detected. For example, if likely child speech is detected, the user interface may change to a simplified safe mode that allows restricted web browsing and application use. In some implementations, when child speech is detected, the client device may not store the child's inputs in search logs or adapt the speaker profile on the client device based on the child's inputs. Some implementations may provide an override feature for adult users in case the client device erroneously determines that the user has vocal characteristics corresponding to child speech. As another example, if elderly speech is detected, the user interface may provide large icons and text.

The client device may also provide identified characteristics of a speaker to native or third party applications, for example, in the form of an application programming interface (API). A user may have the option to selectively enable and/or disable the sharing of their characteristics with these other applications. In some implementations, the client device may request access before such an API may be installed, in which case the user may affirmatively approve installation of the API.

As described herein, customizing the user interface based on characteristics of a speaker should be distinguished from selecting or accessing a user profile based on voice and/or speech recognition. Some client devices may allow a user to establish a user profile and store a set of preferences for operating the client device in the user profile. The user profile can include, for example, the files and folders saved by the user; the applications, software, and programs, downloaded to the computing device by the user; security settings for loading the user profile; operation restrictions for the user; user interface of the client device including font size, icon size, type of wallpaper, icons to be displayed; and any other items or settings for operation of the user profile on the client device.

However, customizing the user interface based on the characteristics of a speaker may be performed in addition to, or instead of, selecting a user profile. For example, in some implementations, the client device may perform speech and/or voice recognition to access a user profile and unlock a client device. The same utterance used to access the user profile may also be analyzed to identify characteristics of the speaker and customize the user interface associated with the user profile. Alternatively or in addition, the client device may access a default user profile and the user may unlock a device using, for example, a PIN, password, username and password, or biometrics. After the client device has been unlocked, the user may make an utterance and the client device may customize the user interface based on characteristics of the user's voice.

FIG. 1 illustrates a client device 100 configured to identify characteristics of a speaker and customize a user interface 110 based on the identified characteristics. In particular, a user 102 speaks an utterance 104 into the client device 100, which generates an audio signal encoding the utterance. The client device 100 then processes the audio signal to identify characteristics of the user 102. For example, the client device may provide the audio signal to a trained classifier (e.g., a neural network) at the client device 100. Alternatively or in addition, the client device 100 may provide the audio signal to a server 120 via a network 130, and the server then provides the audio signal to a trained classifier at the server. The client device 100 and/or the server then uses output from the trained classifier to identify voice characteristics of the user 102. These voice characteristics are then used to customize the user interface 110 of the client device. As shown in FIG. 1, the user interface 110a represents the display of the client device before analyzing the voice characteristics of the user 102, and the user interface 110b represents the display after analyzing the voice characteristics of the user 102.

The client device 100 can be, for example, a desktop computer, laptop computer, a tablet computer, a wearable computer, a cellular phone, a smart phone, a music player, an e-book reader, a navigation system, or any other appropriate computing device. The functions performed by the server 120 can be performed by individual computer systems or can be distributed across multiple computer systems.

The network 130 can be wired or wireless or a combination of both and can include the Internet.

In more detail, a user 102 of the client device 100 initiates a speech recognition session such that the client device encodes an audio signal that includes the utterance 104 of the user. The user may, for example, press a button on the client device 100 to perform a voice search or input a voice command or hotword, speak an utterance, and then release the button on the client device 100. In another example, the user may select a user interface control on the client device 100 before speaking the utterance. As another example, the user 102 may activate a voice unlock feature on the client device 100 by speaking an utterance. The client device 100 encodes the utterance into an audio signal, which may be, for example, a snippet of relatively high quality audio, such as 16 kHz lossless audio.

In some implementations involving a voice unlock feature, the client device 100 may perform speech and/or voice recognition on the utterance to identify the speaker as an authorized user of the device and then unlock the device. For example, the client device 100 and/or the server 120 may compare a voice signature of the utterance with one or more voice signatures associated with authorized users that are stored on the client device. Alternatively or in addition, the client device 100 and/or the server 120 may perform speech recognition on the utterance to identify an authorized password or phrase associated with an authorized user of the client device. In some aspects, different users of the same client device 100 may each establish a user profile that includes preferences for operating the client device associated with the user and the applications of interest to the user. Each user profile may also be associated with one or more voice signatures, passwords, and/or passphrases. When the client device 100 identifies a voice signature, password, and/or passphrase associated with a user profile, the client device select the associated user profile, unlock the client device, and provide access to that user profile.

The client device 100 and/or the server 120 then identify audio characteristics. These audio characteristics may be independent of the words spoken by the user 102. For example, the audio characteristics may indicate audio features that likely correspond to one or more of the speaker's gender, the speaker's age, speaker's emotional state, and/or the speaker's dialect. While feature vectors may be indicative of audio characteristics of specific portions of the particular words spoken, the audio characteristics may be indicative of time-independent characteristics of the audio signal.

As discussed further below, the audio characteristics can include latent variables of multivariate factor analysis (MFA) of the audio signal. The latent variables may be accessed from data storage, received from another system, or calculated by the client device 100 and/or the server 120. To obtain the audio characteristics, feature vectors derived from the audio signal may be analyzed by a factor analysis model. The factor analysis model may create a probabilistic partition of an acoustic space using a Gaussian Mixture Model, and then average the feature vectors associated with each partition. The averaging can be a soft averaging weighted by the probability that each feature vector belongs to the partition. The result of processing with the factor analysis model can be an i-vector, as discussed further below.

In the illustrated example, the client device 100 and/or the server 120 inputs the audio characteristics into a trained classifier. The audio characteristics may be represented by, for example, an i-vector and/or acoustic features such as MFCCs or PLPs. The classifier may be, for example, a Gaussian mixture mode, a neural network, a logistic regression classifier, or a support vector machine (SVM). The classifier has been trained to classify the features of interest. Training data for the classifier could include, for example, voice search logs annotated as corresponding to: child, adult, or elderly speech; male or female speech; or regionally dialected speech. Classifications for certain characteristics may be determined using other techniques, such as, for example, using the pitch characteristics of the speech recording to detect child speech, or by clustering data for male and female speakers. As another example, in some implementations, the dialect may be determined by the client device 100 and/or the server 120 using the automated dialect-identifying processes described, for example, in D. Martinez, O. Plchot, L. Burget, Ondrej Glembek, and Pavel Matejka, "Language Recognition in iVectors Space.," INTERSPEECH., pp. 861-864, ISCA (2011); K. Hirose et al., "Accent Type Recognition And Syntactic Boundary Detection Of Japanese Using Statistical Modeling Of Moraic Transitions Of Fundamental Frequency Contours," Proc. IEEE ICASSP'98 (1998); T. Chen et al., "Automatic Accent Identification using Gaussian Mixture Models," IEEE Workshop on ASRU (2001); or R. A. Cole, J. W. T. Inouye, Y. K. Muthusamy, and M. Gopalakrishnan, "Language identification with neural networks: a feasibility study," Communications, Computers and Signal Processing, 1989 Conference Proceeding., IEEE Pacific Rim Conference on, 1989, pp. 525-529. As another example, emotions of a speaker may be classified using techniques such as those described in K. Rao, S. Koolagudi, and R. Vempada, "Emotion Recognition From Speech Using Global and Local Prosodic Features," Intl Journal of Speech Technology, Vol. 16, Issue 2, pp. 143-160 (June 2013) or D. Ververidis, C. Kotropoulos, "Emotional speech recognition: Resources, features, and methods," Speech Communication 48, pp. 1162-81 (2006).

The classifier then outputs data classifying various characteristics of the speaker. For example, the classifier may output a set of likelihoods for the speaker's age, gender, emotion, and/or dialect. In particular, the output may be a normalized probability between zero and one for one or more of these characteristics. Output for a gender classification may be, for example, male—0.80, female—0.20. Output for an age classification may be, for example, child—0.6, adult—0.3, elderly—0.1. Output for an emotion classification may be, for example, happy—0.6, angry—0.3, sad—0.1. Output for a dialect classification may be, for example, British English—0.5, Kiwi English—0.2, Indian English—0.1, Australian English—0.1, Irish English—0.1.

The client device 100 and/or the server 120 then identifies characteristics of the user 102 based on the output of the classifier. For example, the client device and/or the server 120 may select the characteristics having the highest probability. To continue the example above, the client device and/or the server 120 may identify the user 102 as a male child speaking British English. In some cases, the client device 102 may apply a minimum threshold probability to the selection. In such instances, where the classifier does not identify a characteristic as having a probability that exceeds the threshold, the client device 100 and/or server 120 may select a default characteristic such as "unknown," may prompt the user for additional information, and/or may cause an error message to be outputted to the user 102 (e.g., "please say that again," or "please provide additional information").

Once the characteristics of the user 102 have been identified, the client device 100 customizes the user interface 110 based on these characteristics. Customizing the user interface 110 may include, for example, changing layout, font size, icon size, color scheme, wallpaper, icons and/or text to be displayed, animations, and any other items or settings for operation of the client device. Customizing user interface may also include, for example, restricting and/or modifying the operation of one or more applications executing on the client device. The specific customizations that will correspond to various characteristics may be determined based on user information, demographic information, surveys, empirical observations, and/or any other suitable techniques.

For example, to continue the example where the user 102 has been identified as a male child speaking British English, the client device modifies the user interface to correspond to a child safe mode. In particular, before analyzing the voice characteristics of the user 102, the user interface 110a includes a full complement of applications that may be accessed, including a camera application, a contact application, a calendar application, a search application, a messaging application, a browser application, a call application, and an email application. In contrast, after analyzing the voice characteristics, the user interface 110b has been modified to permit access only to a camera application and a phone call application. The icons for both of these applications have also been enlarged to make it easier for children to understand and operate. In some implementations, the user interface 110b for a child mode may also restrict or modify the operations of the applications that are accessible, for example by limiting the phone numbers that can be called (e.g., only able to call home), limiting the number of pictures that can be taken, or restricting the websites that can be accessed. For example, the client device 100 may provide information regarding the characteristics of the user to native and/or third-party applications with an API on the client device, which the applications may use to modify their operations.

For situations in which the systems discussed here collect personal information about users, or may make use of personal information, the users may be provided with an opportunity to control whether programs or features collect personal information (e.g., information about a user's social network, social actions or activities, profession, a user's preferences, or a user's current location), or to control whether and/or how to receive content from the content server that may be more relevant to the user. In addition, certain data may be anonymized in one or more ways before it is stored or used, so that personally identifiable information is removed. For example, a user's identity may be anonymized so that no personally identifiable information can be determined for the user, or a user's geographic location may be generalized where location information is obtained (such as to a city, ZIP code, or state level), so that a particular location of a user cannot be determined. Thus, the user may have control over how information is collected about him or her and used by a content server.

Figure 2:
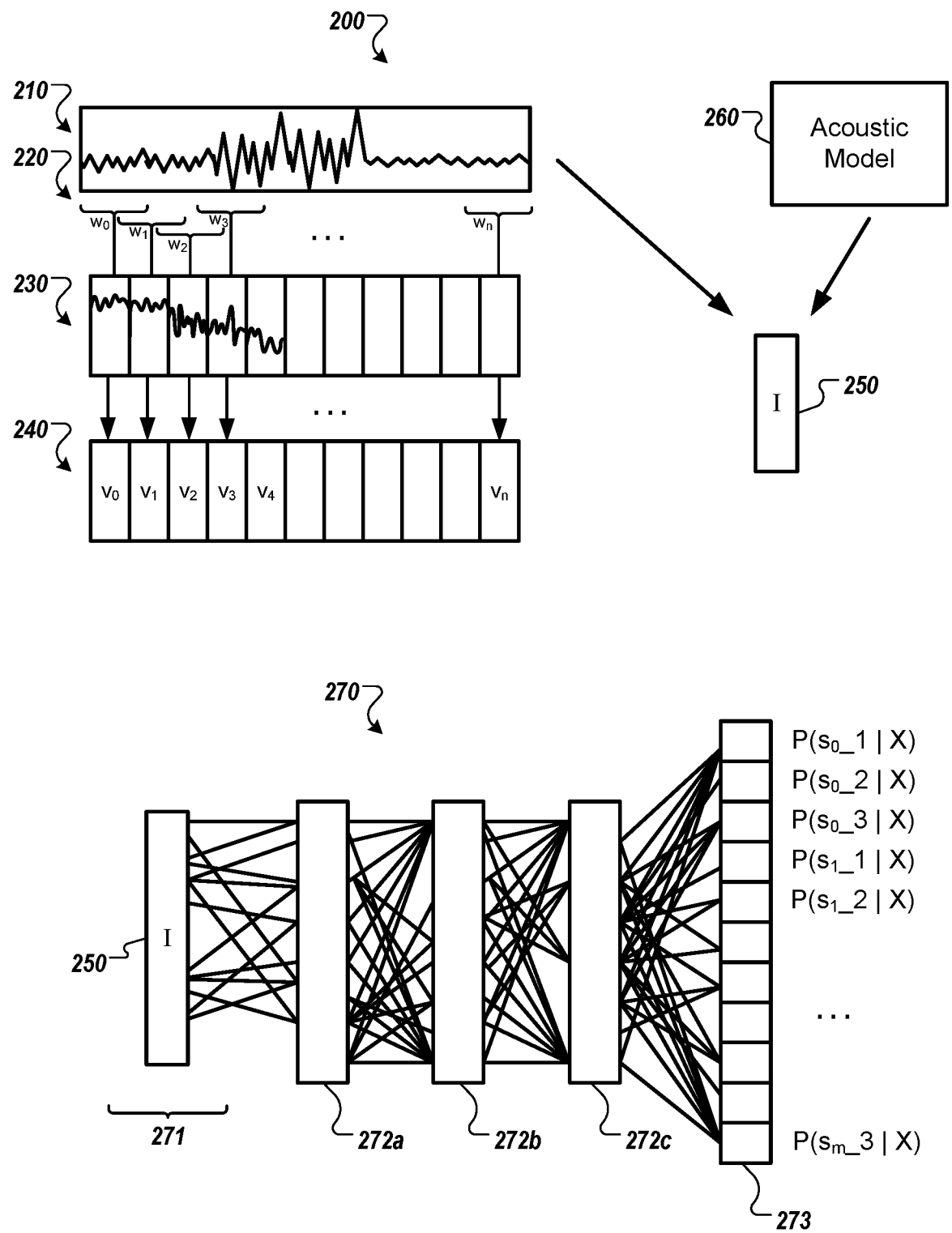
FIG. 2 is a diagram that illustrates an example of processing for speech recognition using neural networks.

FIG. 2 is a diagram 200 that illustrates an example of processing for speech recognition using neural networks. The operations discussed are described as being performed by the server 120, but may be performed by other systems, including combinations of the client device 100 and/or multiple computing systems. While the example architecture described with reference to FIG. 2 includes i-vector inputs into a neural network classifier, the present disclosure is not limited to this architecture. For example, any suitable inputs representing audio characteristics of the speaker, such as MFCCs, or PLPs, could be used. In particular, a neural network could be trained directly from acoustic features (MFCCs or PLPs), e.g., a neural network could receive an MFCC vector (X) and predict the characteristic that maximizes P(L|X) in a similar manner as described below. As another example, any suitable classifier may be used such as an SVM or logistic regression.

The server 120 receives data about an audio signal 210 that includes speech to be recognized. The server 120 or another system then performs feature extraction on the audio signal 210. For example, the server 120 analyzes different segments or analysis windows 220 of the audio signal 210. The windows 220 are labeled $w_0 \ldots w_n$, and as illustrated, the windows 220 can overlap. For example, each window 220 may include 25 ms of the audio signal 210, and a new window 220 may begin every 10 ms. For example, the window 220 labeled $w_0$ may represent the portion of audio signal 210 from a start time of 0 ms to an end time of 25 ms, and the next window 220, labeled wi, may represent the portion of audio signal 120 from a start time of 10 ms to an end time of 35 ms. In this manner, each window 220 includes 15 ms of the audio signal 210 that is included in the previous window 220.

The server 120 performs a Fast Fourier Transform (FFT) on the audio in each window 220. The results of the FFT are shown as time-frequency representations 230 of the audio in each window 220. From the FFT data for a window 220, the server 120 extracts features that are represented as an acoustic feature vector 240 for the window 220. The acoustic features may be determined by binning according to filterbank energy coefficients, using an MFCC transform, using a PLP transform, or using other techniques. In some implementations, the logarithm of the energy in each of various bands of the FFT may be used to determine acoustic features.

The acoustic feature vectors 240, labeled $v_1 \ldots v_n$, include values corresponding to each of multiple dimensions. As an example, each acoustic feature vector 240 may include a value for a PLP feature, a value for a first order temporal difference, and a value for a second order temporal difference, for each of 13 dimensions, for a total of 39 dimensions per acoustic feature vector 240. Each acoustic feature vector 240 represents characteristics of the portion of the audio signal 210 within its corresponding window 220.

The server 120 may also obtain an i-vector 250. For example, the server 120 may process the audio signal 210 with an acoustic model 260 to obtain the i-vector 250. In the example, the i-vector 250 indicates latent variables of multivariate factor analysis. The i-vector 250 may be normalized, for example, to have a zero mean unit variance. In addition, or as an alternative, the i-vector 250 may be projected, for example, using principal component analysis (PCA) or linear discriminant analysis (LDA). Techniques for obtaining an i-vector are described further below with respect to FIG. 3.

The server 120 uses a neural network 270 that can serve as an acoustic model and indicate likelihoods that acoustic feature vectors 240 represent different phonetic units. The neural network 270 includes an input layer 271, a number of hidden layers 272a-272c, and an output layer 273. The neural network 270 receives an i-vector as input. For example, the first hidden layer 272a has connections from the i-vector input portion of the input layer 271, where such connections are not present in typical neural networks used for speech recognition.

The neural network 270 has been trained to estimate likelihoods that an i-vector represents various speaker characteristics. For example, during training, input to the neural network 270 may be i-vectors corresponding to the utterances from which the acoustic feature vectors were derived. The various training data sets can include i-vectors derived from utterances from multiple speakers.

To classify speaker characteristics from the audio signal 210 using the neural network 270, the server 120 inputs the i-vector 250 at the input layer 271 of the neural network 270. At the output layer 273, the neural network 270 indicates likelihoods that the speech corresponds to specific speaker characteristics. The output layer 273 provides predictions or probabilities for these characteristics given the data at the input layer 271. The output layer 273 can provide a value, for each of the speaker characteristics of interest. Because the i-vector 250 indicates constant or overall properties of the audio signal 210 as a whole, the information in the i-vector 250 is independent of the particular acoustic states that may occur at specific windows 220.

In some implementations, the i-vector 250 is based on a current utterance i-vector derived from the current utterance (e.g., the particular audio signal 210) being recognized. In some implementations, the i-vector 250 may be a speaker i-vector generated using multiple utterances of the speaker (e.g., utterances from multiple different recording sessions, such as recordings on different days). For example, multiple utterances for a speaker may be stored in association with a user profile, and the utterances may be retrieved to update a speaker i-vector for that user profile. To generate a speaker i-vector, an i-vector can be determined for each utterance in the set of multiple utterances of the speaker. The i-vectors can be averaged together to generate the speaker i-vector. In some implementations, where a speaker i-vector is used rather than an utterance i-vector derived from the utterance being recognized, post processing may discriminative training, such as LDA, to identify attributes that are indicative of speaker characteristics. For example, various techniques can be used to isolate speaker characteristics, independent of noise, room characteristics, and other non-speaker-dependent characteristics.

In some implementations, the server 120 may identify the speaker and select an i-vector based on the speaker's identity. An i-vector may be calculated for each of multiple users, and the i-vectors may be stored in association with user profiles for those users for later use in recognizing speech of the corresponding users. The server 120 may receive a device identifier for a device, such as a mobile phone, that the speaker is using to record speech. In addition, or as an alternative, the server 120 may receive a user identifier that identifies the user, such as a name or user account login. The server 120 may identify the speaker as a user that owns the device or a user is logged into a user account on the device. In some implementations, the server 120 may identify the speaker before recognition begins, or before audio is received during the current session. The server 120 may then look up the i-vector that corresponds to the identified user and use that i-vector to recognize received speech.

In some implementations, a successive approximation technique may be used to approximate and re-estimate the i-vector 250 while audio is received. The i-vector 250 may be re-estimated at a predetermined interval, for example, each time a threshold amount of new audio has been received. For example, a first i-vector may be estimated using the initial three seconds of audio received. Then, after another three seconds of audio has been received, a second i-vector may be estimated using the six seconds of audio received so far. After another three seconds, a third i-vector may be estimated using all nine seconds of audio received, and so on. The re-estimation period may occur at longer intervals, such as 10 seconds or 30 seconds, to reduce the amount of computation required. In some implementations, i-vectors are re-estimated at pauses in speech (e.g., as detected by a speech energy or voice activity detection algorithm), rather than at predetermined intervals.

An i-vector derived from a small segment of an utterance may introduce some inaccuracy compared to an i-vector for the entire utterance, but as more audio is received, the estimated i-vectors approach the accuracy of an i-vector derived from the whole utterance. In addition, audio from recent utterances (e.g., audio from a predetermined number of most recent utterances or audio acquired within a threshold period of the current time) may be used with received audio to estimate the i-vectors, which may further reduce any inaccuracy present in the estimates.

In some implementations, the server 120 transitions from using a first i-vector to a second i-vector during recognition of an utterance. For example, the server 120 may begin by using a first i-vector derived from a previous utterance. After a threshold amount of audio has been received (e.g., 3, 5, 10, or 30 seconds), the server 120 generates a second i-vector based on the audio received in the current session and uses the second i-vector to process subsequently received audio.

Figure 3:
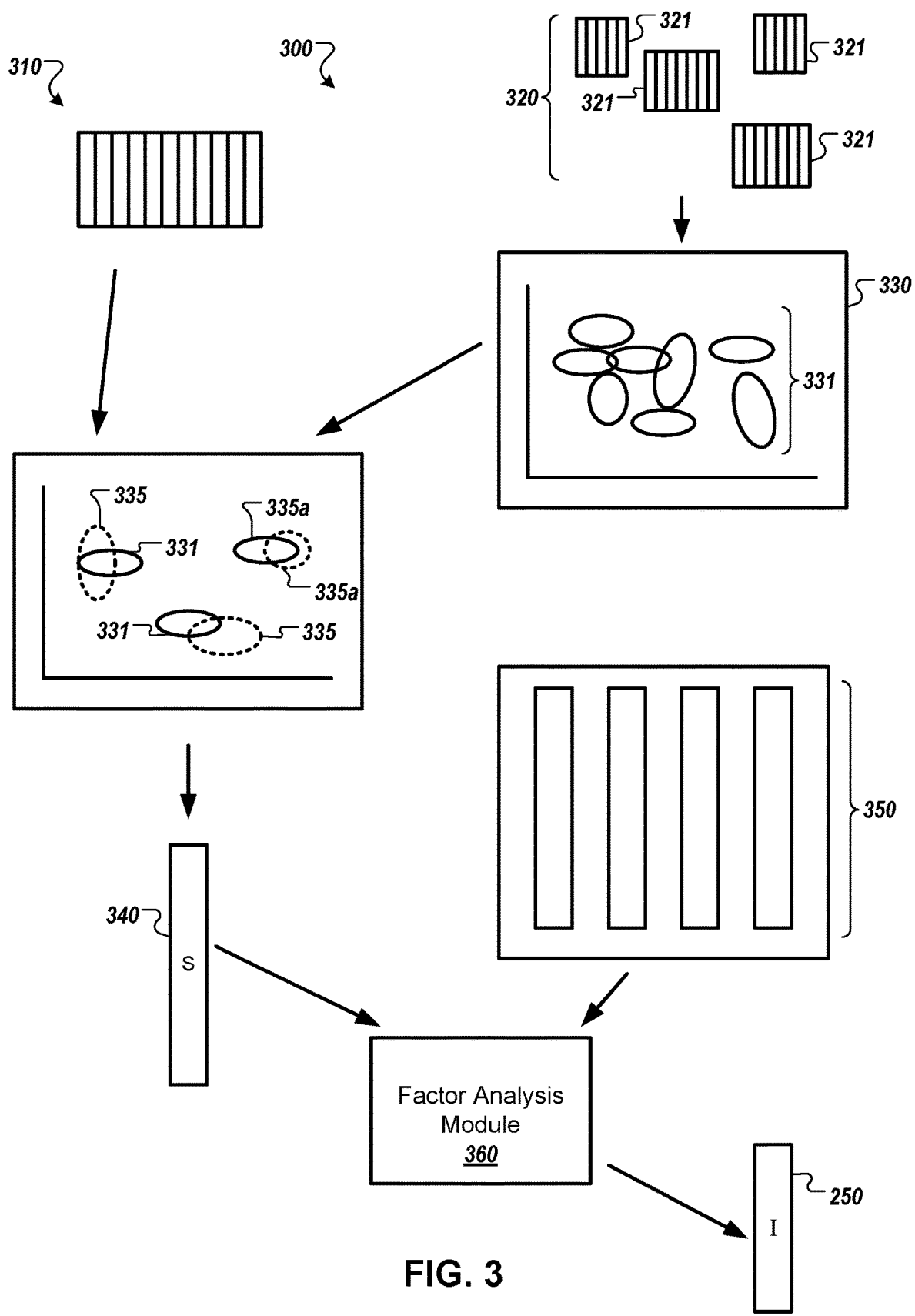
FIG. 3 is a diagram that illustrates an example of processing to generate latent variables of factor analysis.

FIG. 3 is a diagram 300 that illustrates an example of processing to generate latent variables of factor analysis. The example of FIG. 3 shows techniques for determining an i-vector, which includes these latent variables of factor analysis. I-vectors are time-independent components that represent overall characteristics of an audio signal rather than characteristics at a specific segment of time within an utterance. I-vectors can summarize a variety of characteristics of audio that are independent of the phonetic units spoken, for example, information indicative of the age, gender, emotion, and/or dialect of the speaker.

The example of FIG. 3 illustrates processing to calculate an i-vector 250 for a sample utterance 310. The server 120 accesses training data 320 that includes a number of utterances 321. The training data 320 may include utterances 321 including speech from different speakers, utterances 321 having different background noise conditions, and utterances 321 having other differences. Each of the utterances 321 is represented as a set of acoustic feature vectors. Each of the acoustic feature vectors can be, for example, a 39-dimensional vector determined in the same manner that the acoustic feature vectors 240 are determined in the example of FIG. 2.

The server 120 uses the utterances 321 to train a Gaussian mixture model (GMM) 330. For example, the GMM 330 may include 1000 39-dimensional Gaussians 331. The GMM 330 is trained using the acoustic feature vectors of the utterances 321 regardless of the phones or acoustic states that the acoustic feature vectors represent. As a result, acoustic feature vectors corresponding to different phones and acoustic states are used to train the GMM 330. For example, all of the acoustic feature vectors from all of the utterances 321 in the training data 320 can be used to train the GMM 330. In this respect, the GMM 330 is different from GMMs that are trained with only the acoustic feature vectors for a single phone or a single acoustic state.

When the sample utterance 310 is received, the server 120 determines acoustic feature vectors that describe the utterance 310. The server 120 classifies the acoustic feature vectors of the utterance 310 using the GMM 330. For example, the Gaussian 331 that corresponds to each acoustic feature vector of the sample utterance 310 may be identified. The server 120 then re-estimates the Gaussians 331 that are observed in the sample utterance 310, illustrated as re-estimated Gaussians 335 shown in dashed lines. As an example, a set of one or more acoustic feature vectors of the sample utterance 310 may be classified as matching a particular Gaussian 331a from the GMM 330. Based on this set of acoustic feature vectors, the server 120 calculates a re-estimated Gaussian 335a having a mean and/or variance different from the Gaussian 331a. Typically, only some of the Gaussians 331 in the GMM 330 are observed in the sample utterance 310 and re-estimated.

The server 120 then identifies differences between the Gaussians 331 and the corresponding re-estimated Gaussians 335. For example, the server 120 may generate difference vectors that each indicate changes in parameters between a Gaussian 331 and its corresponding re-estimated Gaussian 335. Since each of the Gaussians is 39-dimensional, each difference vector can have 39 values, where each value indicates a change in one of the 39 dimensions.

The server 120 concatenates or stacks the difference vectors to generate a supervector 340. Because only some of the Gaussians 331 were observed and re-estimated, a value of zero (e.g., indicating no change from the original Gaussian 331) is included in the supervector 340 for each the 39 dimensions of each Gaussian 331 that was not observed in the sample utterance 310. For a GMM 330 having 1000 Gaussians that are each 39-dimensional, the supervector 340 would include 39,000 elements. In many instances, Gaussians 331 and the corresponding re-estimated Gaussians 335 differ only in their mean values. The supervector 340 can represent the differences between the mean values of the Gaussians 331 and the mean values of the corresponding re-estimated Gaussians 335.

In addition to generating the supervector 340, the server 120 also generates a count vector 345 for the utterance 310. The values in the count vector 345 can represent $0^{th}$ order Baum-Welch statistics, referred to as counts or accumulated posteriors. The count vector 345 can indicate the relative importance of the Gaussians 331 in the GMM 330. The count vector 345 includes a value for each Gaussian 331 in the GMM 330. As a result, for a GMM 330 having 1000 Gaussians, the count vector 345 for the utterance 310 would include 1,000 elements. Each value in the vector 345 can be the sum of the posterior probabilities of the feature vectors of the utterance 310 with respect to a particular Gaussian 331. For example, for a first Gaussian 331a, the posterior probability of each feature vector in the utterance 310 is computed (e.g., the probability of occurrence of the feature vector as indicated by the first Gaussian 331a). The sum of the posterior probabilities for the feature vectors in the utterance 310 is used as the value for the first Gaussian 331a in the count vector 345. Posterior probabilities for the each feature vector in the utterance 310 can be calculated and summed for each of the other Gaussians 331 to complete the count vector 345.

In the same manner that the supervector 340 and count vector 345 was generated for the sample utterance 310, the server 120 generates a supervector 350 and a count vector 355 for each of the utterances 321 in the training data 320. The GMM 330, the supervectors 350, and the count vectors 355 may be generated and stored before receiving the sample utterance 310. Then, when the sample utterance 310 is received, the previously generated GMM 330, supervectors 350, and count vectors can be accessed from storage, which limits the amount of computation necessary to generate an i-vector for the sample utterance 310.

The server 120 uses the supervectors 350 to create a factor analysis module 360. The factor analysis module 360, like the GMM 330 and the supervectors 350, may be generated in advance of receiving the sample utterance 310. The factor analysis module 360 can perform multivariate factor analysis to project a supervector to a lower-dimensional vector that represents particular factors of interest. For example, the factor analysis module may project a supervector of 39,000 elements to a vector of only a few thousand elements or only a few hundred elements.

The factor analysis module 360, like the GMM 330, is trained using a collection of utterances, which may be the utterances in the same training data 320 used to generate the GMM 330. An adapted or re-estimated GMM may be determined for each of the i utterances $[U_1, U_2, \ldots, U_i]$ in the training data 320, in the same manner that the re-estimated Gaussians 335 are determined for the utterance 310. A supervector 350 $[S_1, S_2, \ldots, S_i]$ and count vector 355 $[C_1, C_2, \ldots, C_i]$ for each utterance $[U_1, U_2, \ldots, U_i]$ is also determined. Using the vector pairs $[S_i, C_i]$ for each utterance, the factor analysis module 360 is trained to learn the common range of movement of the adapted or re-estimated GMMs for the utterances $[U_1, U_2, \ldots, U_i]$ relative to the general GMM 330. Difference parameters between re-estimated GMMs and the GMM 330 are then constrained to move only over the identified common directions of movement in the space of the supervectors. Movement is limited to a manifold, and the variables that describe the position of the difference parameters over the manifold are denoted as i-vectors. As a result, the factor analysis module 360 learns a correspondence $[S_i, C_i]\text{-->i-vector}_i$, such that $S_i/C_i=f(\text{i-vector}_i)$, where f( ) is a linear function f(x)=T*x and T is a matrix.

The server 120 inputs the supervector 340 and count vector 345 for the sample utterance 310 to the trained factor analysis module 360. The output of the factor analysis module 360 is the i-vector 250, which includes latent variables of multivariate factor analysis. The i-vector 250 represents time-independent characteristics of the sample utterance 310 rather than characteristics of a particular window or subset of windows within the sample utterance 310. In some implementations, the i-vector 250 may include, for example, approximately 300 elements.

Figure 4:
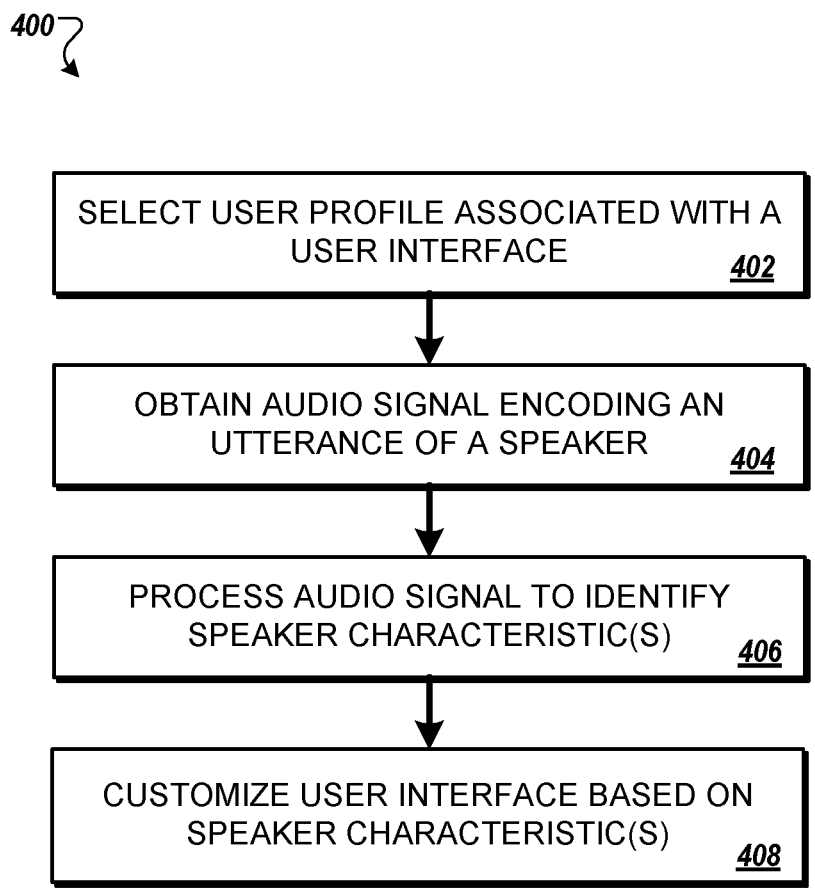
FIG. 4 is a flow diagram that illustrates an example of a process for customizing a user interface based on characteristics of a speaker.

FIG. 4 is a flow diagram that illustrates an example of a process for customizing a user interface based on characteristics of a speaker. The process 400 may be performed by data processing apparatus, such as the client device 100 described above or another data processing apparatus.

In step 402, the client device selects a user profile associated with the user interface. For example, the client device may select a user profile based on one or more of a password, voice recognition, speech recognition, fingerprint recognition, or facial recognition. In some instances, the client device may have a default user profile, in which case the client device typically selects and operates using the default user profile.

In step 404, after selecting the user profile, the client device obtains an audio signal encoding an utterance of the speaker. For example, the client device may receive an utterance of the speaker at a microphone, and encode the utterance into an audio signal such as, for example, a 16 kHz lossless audio signal.

The client device (optionally in combination with one or more servers), in step 406, processes the audio signal to identify one or more characteristics of the speaker. In some implementations, the characteristics may include one or more of an age, gender, emotion, and/or an dialect of the speaker. For example, the client device may provide the audio signal to a trained classifier (e.g., a neural network, SVM, or a Gaussian mixture model) that outputs likelihoods associated with one or more characteristics of the speaker. The client device may then select characteristics having the highest likelihood, and/or apply a threshold to identify characteristics of the speaker. Alternatively or in addition, the client device may transmit the audio signal to a server, which inputs the audio signal to a trained classifier, identifies characteristics of the speaker using the classifier, and then transmits the identified characteristics back to the client device.

Finally, in step 408, the client device customizes the user interface associated with the user profile based on the identified characteristics. For example, the client device may change layout, font size, icon size, color scheme, wallpaper, icons and/or text to be displayed, animations, and any other items or settings for operation of the client device. In some cases, the client device may restrict access to applications that were previously accessible, and/or provide access to applications that were previously inaccessible. The client device also may, for example, restrict and/or modify the operation of one or more applications executing on the client device. For example, the client device may restrict a web browsing application to provide access to only a limited set of websites.

In some implementations, the client device may also provide one or more of the characteristics of the speaker to native and/or third-party applications executing on the client device. The client device may provide users with an option to decide whether to share this information with native and/or third-party applications.

Figure 5:
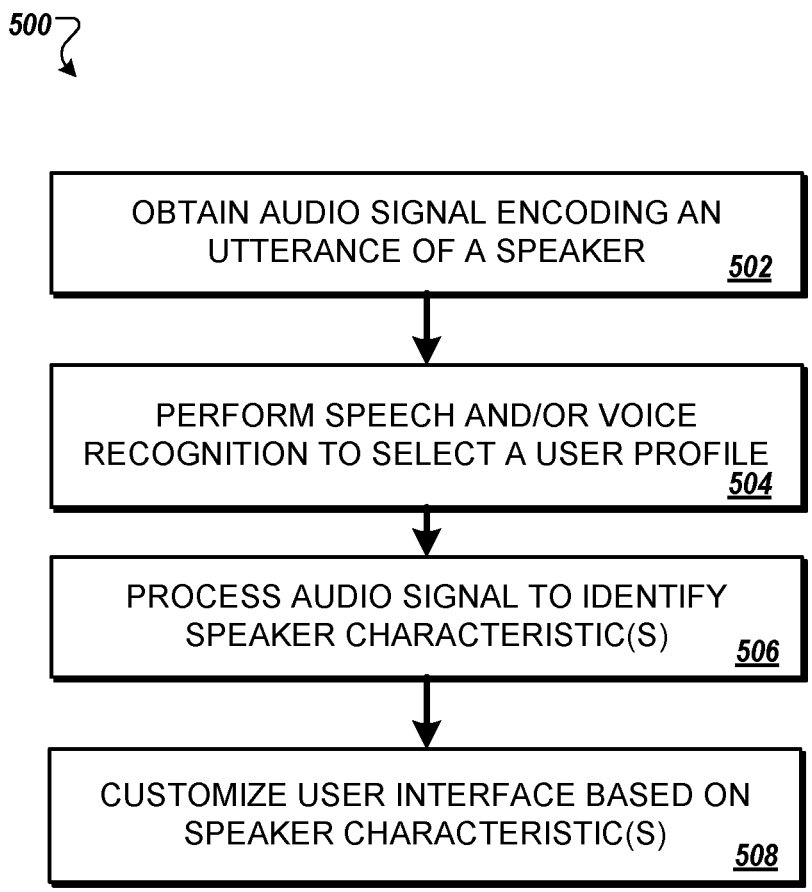
FIG. 5 is a flow diagram that illustrates another example of a process for customizing a user interface based on characteristics of a speaker.

FIG. 5 is a flow diagram that illustrates another example of a process for customizing a user interface based on characteristics of a speaker. The process 500 may be performed by data processing apparatus, such as the client device 100 described above or another data processing apparatus.

In step 502, the client device selects a user profile associated with the user interface. The client device obtains an audio signal encoding an utterance of the speaker. For example, the client device may receive an utterance of the speaker at a microphone, and encode the utterance into an audio signal such as, for example, a 16 kHz lossless audio signal.

In step 504, the client device (optionally in combination with one or more servers) perform speech recognition, voice recognition, or both on the audio signal to select and/or access the user profile associated with the user interface. In some instances, the client device may have a default user profile, in which case the client device may provide access to the default user profile when speech recognition and/or voice recognition successfully authenticate the speaker.

The client device (optionally in combination with one or more servers), in step 506, also processes the audio signal to identify one or more characteristics of the speaker. In some implementations, the characteristics may include one or more of an age, gender, emotion, and/or dialect of the speaker. For example, the client device may provide the audio signal to a trained classifier (e.g., a neural network, SVM, or a Gaussian mixture model) that outputs likelihoods associated with one or more characteristics of the speaker. The client device may then select characteristics having the highest likelihood, and/or apply a threshold to identify characteristics of the speaker. Alternatively or in addition, the client device may transmit the audio signal to a server, which inputs the audio signal to a trained classifier, identifies characteristics of the speaker using the classifier, and then transmits the identified characteristics back to the client device.

Finally, in step 508, the client device customizes the user interface associated with the user profile based on the identified characteristics. For example, the client device may change layout, font size, icon size, color scheme, wallpaper, icons and/or text to be displayed, animations, and any other items or settings for operation of the client device. In some cases, the client device may restrict access to applications that were previously accessible, and/or provide access to applications that were previously inaccessible. The client device also may, for example, restrict and/or modify the operation of one or more applications executing on the client device. For example, the client device may restrict a web browsing application to provide access to only a limited set of websites.

In some implementations, the client device may also provide one or more of the characteristics of the speaker to native and/or third-party applications executing on the client device. The client device may provide users with an option to decide whether to share this information with native and/or third-party applications.

A number of implementations have been described. Nevertheless, it will be understood that various modifications may be made without departing from the spirit and scope of the disclosure. For example, various forms of the flows shown above may be used, with steps re-ordered, added, or removed.

Embodiments and all of the functional operations described in this specification may be implemented in digital electronic circuitry, or in computer software, firmware, or hardware, including the structures disclosed in this specification and their structural equivalents, or in combinations of one or more of them. Embodiments may be implemented as one or more computer program products, i.e., one or more modules of computer program instructions encoded on a computer-readable medium for execution by, or to control the operation of, data processing apparatus. The computer readable-medium may be a machine-readable storage device, a machine-readable storage substrate, a memory device, a composition of matter affecting a machine-readable propagated signal, or a combination of one or more of them. The computer-readable medium may be a non-transitory computer-readable medium. The term "data processing apparatus" encompasses all apparatus, devices, and machines for processing data, including by way of example a programmable processor, a computer, or multiple processors or computers. The apparatus may include, in addition to hardware, code that creates an execution environment for the computer program in question, e.g., code that constitutes processor firmware, a protocol stack, a database management system, an operating system, or a combination of one or more of them. A propagated signal is an artificially generated signal, e.g., a machine-generated electrical, optical, or electromagnetic signal that is generated to encode information for transmission to suitable receiver apparatus.

A computer program (also known as a program, software, software application, script, or code) may be written in any form of programming language, including compiled or interpreted languages, and it may be deployed in any form, including as a standalone program or as a module, component, subroutine, or other unit suitable for use in a computing environment. A computer program does not necessarily correspond to a file in a file system. A program may be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program may be deployed to be executed on one computer or on multiple computers that are located at one site or distributed across multiple sites and interconnected by a communication network.

The processes and logic flows described in this specification may be performed by one or more programmable processors executing one or more computer programs to perform functions by operating on input data and generating output. The processes and logic flows may also be performed by, and apparatus may also be implemented as, special purpose logic circuitry, e.g., an FPGA (field programmable gate array) or an ASIC (application specific integrated circuit).

Processors suitable for the execution of a computer program include, by way of example, both general and special purpose microprocessors, and any one or more processors of any kind of digital computer. Generally, a processor will receive instructions and data from a read only memory or a random access memory or both. The essential elements of a computer are a processor for performing instructions and one or more memory devices for storing instructions and data. Generally, a computer will also include, or be operatively coupled to receive data from or transfer data to, or both, one or more mass storage devices for storing data, e.g., magnetic, magneto optical disks, or optical disks. However, a computer need not have such devices. Moreover, a computer may be embedded in another device, e.g., a tablet computer, a mobile telephone, a personal digital assistant (PDA), a mobile audio player, a Global Positioning System (GPS) receiver, to name just a few. Computer readable media suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto optical disks; and CD-ROM and DVD-ROM disks. The processor and the memory may be supplemented by, or incorporated in, special purpose logic circuitry.

To provide for interaction with a user, embodiments may be implemented on a computer having a display device, e.g., a CRT (cathode ray tube) or LCD (liquid crystal display) monitor, for displaying information to the user and a keyboard and a pointing device, e.g., a mouse or a trackball, by which the user may provide input to the computer. Other kinds of devices may be used to provide for interaction with a user as well; for example, feedback provided to the user may be any form of sensory feedback, e.g., visual feedback, auditory feedback, or tactile feedback; and input from the user may be received in any form, including acoustic, speech, or tactile input.

Embodiments may be implemented in a computing system that includes a back end component, e.g., as a data server, or that includes a middleware component, e.g., an application server, or that includes a front end component, e.g., a client computer having a graphical user interface or a Web browser through which a user may interact with an implementation of the techniques disclosed, or any combination of one or more such back end, middleware, or front end components. The components of the system may be interconnected by any form or medium of digital data communication, e.g., a communication network. Examples of communication networks include a local area network ("LAN") and a wide area network ("WAN"), e.g., the Internet.

The computing system may include clients and servers. A client and server are generally remote from each other and typically interact through a communication network. The relationship of client and server arises by virtue of computer programs running on the respective computers and having a client-server relationship to each other.

While this specification contains many specifics, these should not be construed as limitations, but rather as descriptions of features specific to particular embodiments. Certain features that are described in this specification in the context of separate embodiments may also be implemented in combination in a single embodiment. Conversely, various features that are described in the context of a single embodiment may also be implemented in multiple embodiments separately or in any suitable subcombination. Moreover, although features may be described above as acting in certain combinations and even initially claimed as such, one or more features from a claimed combination may in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that the described program components and systems may generally be integrated together in a single software product or packaged into multiple software products.

Thus, particular embodiments have been described. Other embodiments are within the scope of the following claims. For example, the actions recited in the claims may be performed in a different order and still achieve desirable results.

What is claimed is:

1. A computer-implemented method when executed on data processing hardware causes the data processing hardware to perform operations comprising:
receiving audio data corresponding to an utterance captured by a microphone of a user device, the user device shared by one or more users corresponding to a child age classification and one or more other users corresponding to an adult age classification;
generating an utterance feature vector derived from the received audio data corresponding to the utterance;
generating, using a neural network configured to receive the utterance feature vector as input, a probability distribution indicating a likelihood that the utterance was spoken by one of the one or more users corresponding to the child age classification;
determining whether the likelihood that the utterance was spoken by the one of the one or more users corresponding to the child age classification satisfies a threshold;
when the likelihood that the utterance was spoken by the one of the one or more users corresponding to the child age classification satisfies the threshold, generating a safe mode user interface that is associated with the child age classification, the safe mode user interface only allowing access to a selected set of child-safe applications; and providing the safe mode user interface for display on a screen in communication with the data processing hardware.

2. The computer-implemented method of claim 1, wherein the utterance is used to access a user profile.

3. The computer-implemented method of claim 1, wherein the data processing hardware resides on the user device.

4. The computer-implemented method of claim 1, wherein the data processing hardware resides on a server in communication with the user device via a network.

5. The computer-implemented method of claim 1, wherein a button on the user device is pressed before the microphone of the user device captures the utterance.

6. The computer-implemented method of claim 1, wherein the utterance comprises a voice command preceded by a hotword.

7. The computer-implemented method of claim 1, wherein the safe mode user interface includes characteristics targeted to the one or more users corresponding to the child age classification that would not be present in a user interface that would be generated if the utterance was spoken by one of the one or more other users corresponding to the adult age classification.

8. The computer-implemented method of claim 1, wherein the user device comprises a digital assistant device.

9. The computer-implemented method of claim 1, wherein each user among the one or more users corresponding to the child age classification and the one or more other users corresponding to the adult age classification that share the user device establish a respective user profile that includes preferences for operating the user device and applications of interest to the respective user.

10. The computer-implemented method of claim 9, wherein each respective user profile is associated with a respective voice signature for the respective user.

11. A system comprising:
data processing hardware; and
memory hardware in communication with the data processing hardware and storing instructions that when executed by the data processing hardware causes the data processing hardware to perform operations comprising:
receiving audio data corresponding to an utterance captured by a microphone of a user device, the user device shared by one or more users corresponding to a child age classification and one or more other users corresponding to an adult age classification;
generating an utterance feature vector derived from the received audio data corresponding to the utterance;
generating, using a neural network configured to receive the utterance feature vector as input, a probability distribution indicating a likelihood that the utterance was spoken by one of the one or more users corresponding to the child age classification;
determining whether the likelihood that the utterance was spoken by the one of the one or more users corresponding to the child age classification satisfies a threshold;
when the likelihood that the utterance was spoken by the one of the one or more users corresponding to the child age classification satisfies the threshold, generating a safe mode user interface that is associated with the child age classification, the safe mode user interface only allowing access to a selected set of child-safe applications; and
providing the safe mode user interface for display on a screen in communication with the data processing hardware.

12. The system of claim 11, wherein the utterance is used to access a user profile.

13. The system of claim 11, wherein the data processing hardware resides on the user device.

14. The system of claim 11, wherein the data processing hardware resides on a server in communication with the user device via a network.

15. The system of claim 11, wherein a button on the user device is pressed before the microphone of the user device captures the utterance.

16. The system of claim 11, wherein the utterance comprises a voice command preceded by a hotword.

17. The system of claim 11, wherein the safe mode user interface includes characteristics targeted to the one or more users corresponding to the child age classification that would not be present in a user interface that would be generated if the utterance was spoken by one of the one or more other users corresponding to the adult age classification.

18. The system of claim 11, wherein the user device comprises a digital assistant device.

19. The system of claim 11, wherein each user among the one or more users corresponding to the child age classification and the one or more other users corresponding to the adult age classification that share the user device establish a respective user profile that includes preferences for operating the user device and applications of interest to the respective user.

20. The system of claim 19, wherein each respective user profile is associated with a respective voice signature for the respective user.

* * * * *